(12) United States Patent
Collins

(10) Patent No.: US 7,617,578 B2
(45) Date of Patent: Nov. 17, 2009

(54) MITER JOINT ASSEMBLY SYSTEM AND METHOD

(76) Inventor: David Collins, 10179 Brock Rd., Plain City, OH (US) 43064

( * ) Notice: Subject to any disclaimer, the term of this patent is extended or adjusted under 35 U.S.C. 154(b) by 570 days.

(21) Appl. No.: 11/361,944

(22) Filed: Feb. 24, 2006

(65) Prior Publication Data

US 2006/0191122 A1    Aug. 31, 2006

Related U.S. Application Data

(60) Provisional application No. 60/655,726, filed on Feb. 25, 2005.

(51) Int. Cl.
*B23P 23/00* (2006.01)
*B23B 49/02* (2006.01)

(52) U.S. Cl. ............ 29/26 A; 29/564.2; 29/564.7; 29/56.6; 29/525.11; 29/270; 29/278; 29/281.1; 408/202; 408/115 R; 144/1.1; 144/35.1; 144/286.5; 269/41

(58) Field of Classification Search ............ 29/26 A, 29/26 B, 564, 564.1, 564.2, 564.7, 56.6, 270, 29/278, 271, 281.1, 281.5, 525.11, 525.01; 408/202, 203.5, 115 R; 144/1.1, 35.1, 286.1, 144/286.5; 269/41, 37
See application file for complete search history.

(56) References Cited

U.S. PATENT DOCUMENTS 3,695,318 A * 10/1972 Maury .................. 144/35.1
4,448,572 A * 5/1984 Gill ..................... 408/115 R
4,592,401 A * 6/1986 Vanago .................. 144/1.1
5,119,855 A * 6/1992 Knighten et al. .......... 144/365
5,149,236 A * 9/1992 Rapayelian .............. 411/439
5,322,396 A * 6/1994 Blacker ................ 408/72 R
5,553,645 A * 9/1996 Durney .................. 29/26 A
6,283,685 B1 * 9/2001 Lemieux ............... 408/115 R
6,599,064 B1 * 7/2003 Robinson .............. 408/115 R
6,622,997 B2 * 9/2003 Emerson ................. 269/166
6,704,982 B1 * 3/2004 Cassese et al. ............ 144/2.1
6,726,411 B2 * 4/2004 Sommerfeld et al. .... 408/115 R
6,955,508 B1 * 10/2005 Radcliffe .................. 408/37
7,044,460 B2 * 5/2006 Bolton .................... 269/37

* cited by examiner

*Primary Examiner*—Erica E Cadugan
(74) *Attorney, Agent, or Firm*—James R. Eley; Michael A. Forhan; Eley Law Firm Co.

(57) ABSTRACT

A miter joint assembly system. The system comprises a generally planar assembly plate. A clamping assembly is attached to the assembly plate. At least one drill guide is detachably coupled to the assembly plate at a predetermined orientation. The clamping assembly is configured to releasably secure a first and a second mitered molding to the assembly plate such that the first and second mitered moldings are oriented generally orthogonally to each other. The drill guide is configured to bore a pocket hole and a pilot hole into the first mitered molding, the pocket and pilot holes receiving a fastener to draw and secure the second mitered molding to the first mitered molding.

10 Claims, 13 Drawing Sheets

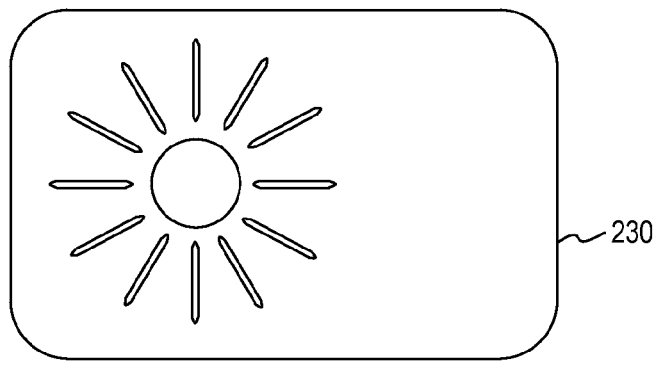
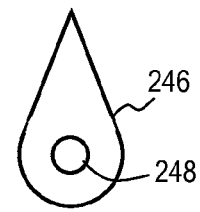
*Fig. 9*     *Fig. 12*
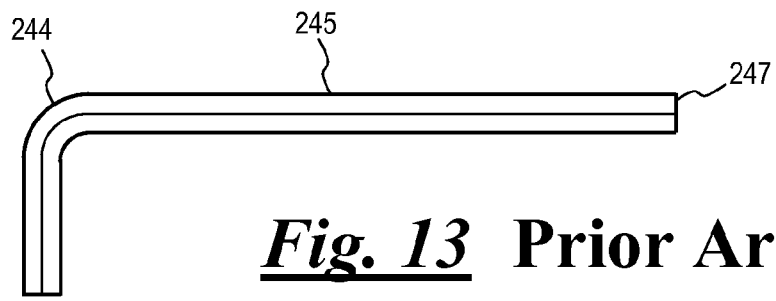
*Fig. 13* Prior Art
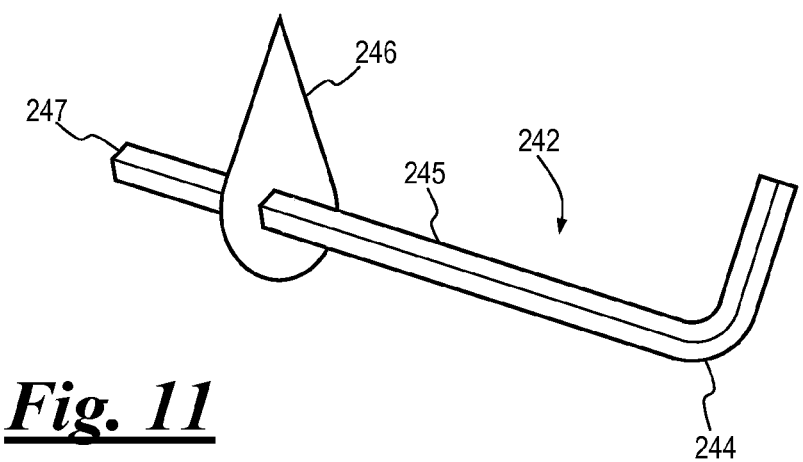
*Fig. 11*

MITER JOINT ASSEMBLY SYSTEM AND METHOD

This application claims priority to U.S. provisional patent application 60/655,726, filed Feb. 25, 2005, the contents of which are hereby incorporated by reference.

FIELD

This invention relates to carpentry tools. In particular, this invention relates to a miter joint assembly system and method for sawing, drilling and fastening mitered moldings together.

BACKGROUND

One of the tasks in finish carpentry involves the trimming of doors and windows with mitered casements. It is desirable to make the miter joints with a close-fitting or "tight" fit, as this is indicative of high-quality workmanship. Miter saw tables have been developed for the purpose of sawing the casements to form the miter joints. A typical miter saw table comprises a central table to which a pivot arm of the saw is rotatably mounted on a vertical axis. A fixed fence comprising coextensive lateral wings extend from each side of the central table, the rear edges of the wings having vertical rail elements and against which a work piece to be cut is maintained during the cutting operation.

Difficulty is often encountered in making tight mitered joints with current methods. This is primarily due to wood movement and fastening methods. Limitations of spring-loaded detents in the angular adjustment features of the pivot arms of miter saws and the small increments on the miter scales make it difficult to make the slight adjustments necessary to make fine adjustments in the cuts. Even when the detents and protractor scale of the miter saw are nearly perfect and produce cut angles that are perfectly divided, slight changes in humidity regularly open up what was once a well-fit miter joint when initially installed.

Numerous methods and tools have been devised in an attempt to improve the mitered casement, including the use of iron clamps, spring clamps, band clamps and other corner clamping devices, along with dowels and splines. Some carpenters use screws to hold a mitered joint together. However, because of the tapering thicknesses of most casements it is difficult to keep the screws from breaking through the surface of the casement. It is also difficult to position the screw so as to maintain generally constant pressure along the length and width of the miter joint. In addition to these shortcomings, current tools and methods are also time-consuming. There is a need to fabricate close-fitting miter joints in a speedier way. There is a further need for miter joints having greater permanence.

SUMMARY

The disclosed invention is a system and method that overcomes the limitations of the prior art by providing an angularly adjustable accessory fence to enable minute adjustments of miter cuts. For example, the miters may be cut so that the assembled joint is slightly greater than the required angle by several minutes of one degree, resulting in a miter joint having a permanently tight, generally uniform seam along the entire length of the joint when the outside corner is mechanically locked and the mitered moldings of the assembly are sprung into the desired position. This results in a pre-loaded miter joint that accommodates seasonal shrinking or swelling of the material without breaking of the joint.

The miter joint assembly system comprises an assembly plate and associated tooling. The system provides a quick and accurate way to saw, align, clamp, drill and fasten mitered casement pieces together. In addition, a method for insuring that the full length of the seam between the pieces is tight and without void or open seam is disclosed. The assembly plate is a flat surface with a guide fence for the support of two mitered pieces of molding in their proper alignment, the plate being connected to a tooling plate opposite the assembly surface. Two offset surfaces are divided by the fence, the lower surface serving to support drill bushings and maintain angular alignment of the bushings perpendicular to the mitered cut at the intersection of the two mitered pieces. A guide bushing is housed in a rectangular form with the center point of the bushing and is incrementally varied as measured perpendicular to each of the four sides. Each side of the rectangular form has a registration groove parallel to the length of the bushing and on a radial line perpendicular to the side, the registration groove being fitted to a spline or key fixed in the support plate. This allows for varying drill heights as the form is rotated, thus allowing on-center drilling for various molding thicknesses.

The disclosed invention further utilizes wood screws that function both as clamps and as permanent fasteners. The edges of a miter joint are cut so that the assembled joint is slightly greater than the required angle by several minutes of one degree. A single screw keeps the outside corner of the joint tight. The screw also acts to pull the moldings to a predetermined angle such that pressure is generated at an inside corner of the joint as the mitered moldings or "legs" are sprung into the desired position for installation, producing a tight seam along the entire length of the joint. The screw is quickly and easily located and installed using the disclosed invention.

An aspect of the present invention is a miter joint assembly system. The system comprises a generally planar assembly plate. A clamping assembly is attached to the assembly plate. At least one drill guide is detachably coupled to the assembly plate at a predetermined orientation. The clamping assembly is configured to releasably secure a first and a second mitered molding to the assembly plate such that the first and second mitered moldings are oriented generally orthogonally to each other. The drill guide is configured to bore a pocket hole and a pilot hole into the first mitered molding, the pocket and pilot holes receiving a fastener to draw and secure the second mitered molding to the first mitered molding.

Another aspect of the present invention is a method for making a miter joint assembly. The method comprises the steps of providing a generally planar assembly plate, attaching a clamping assembly to the assembly plate, and detachably coupling at least one drill guide to the assembly plate at a predetermined orientation. A first and a second mitered moldings are releasably secured to the assembly plate such that the first and second mitered moldings are oriented generally orthogonally to each other. A pocket hole and a pilot hole are bored into the first mitered molding with the drill guide. A fastener is then installed into the pocket and pilot holes to draw and secure the second mitered molding to the first mitered molding.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 9 depicts a stencil according to an embodiment of the present invention;

FIG. 11 depicts an adjustment tool according to an embodiment of the present invention;

FIG. 12 depicts a pointer component of the adjustment tool of FIG. 11;

FIG. 13 depicts a driver component of the adjustment tool of FIG. 11;

DETAILED DESCRIPTION

Figure 1:
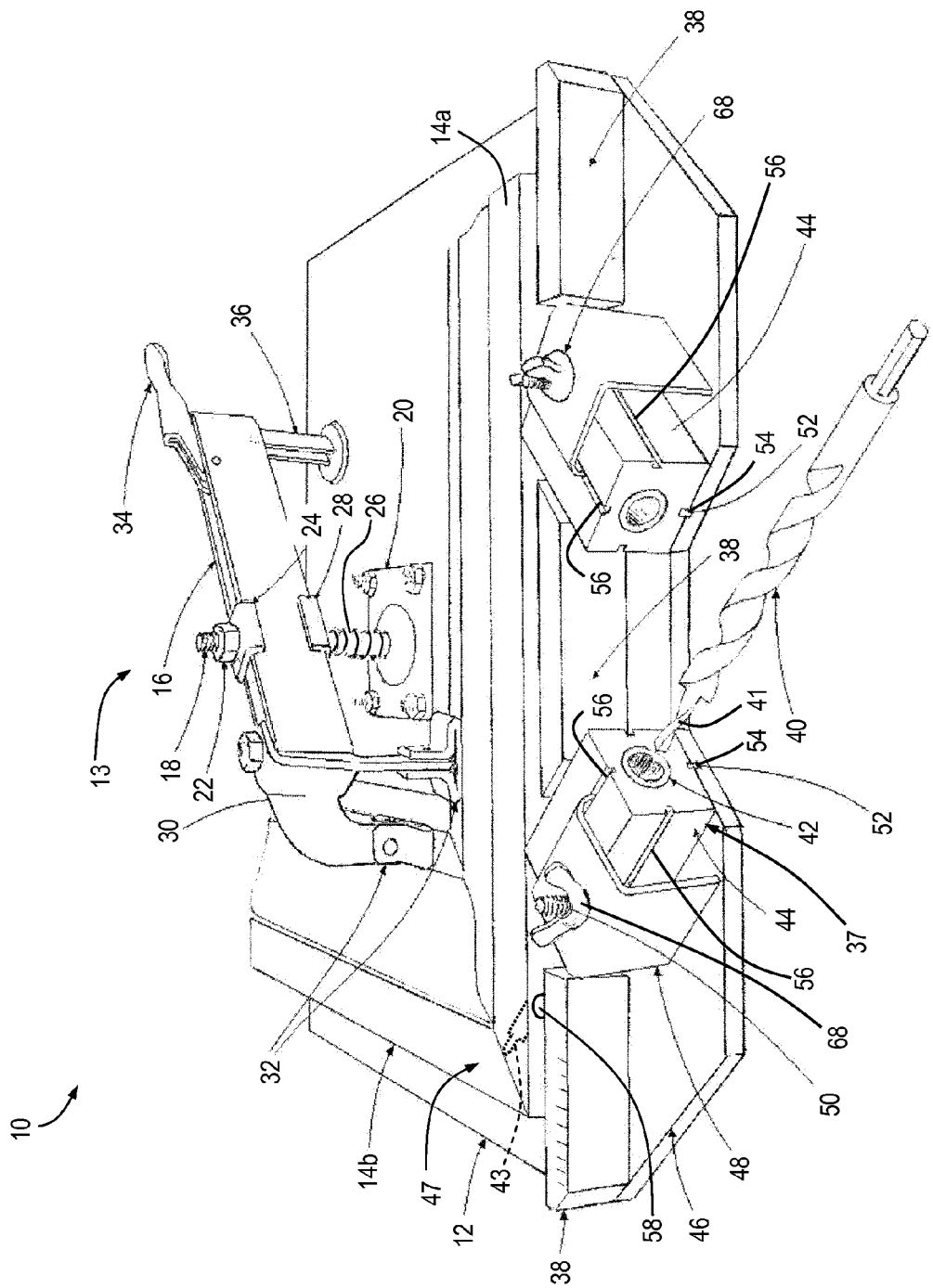
FIG. 1 is perspective drawing of an assembly plate, additionally showing a typical mitered molding held in place by a rocker clamp a set of right-hand and left-hand drill bushings and a typical stepped boring bit in alignment with the left hand bushing.

Certain terminology may be employed in the description to follow for convenience rather than for any limiting purpose. For example, the terms "forward," "rearward," "right," "left," "upper," and "lower" designate directions in the drawings to which reference is made, respectively, to directions toward and away from the center of a referenced element. Terminology of similar import other than the words specifically mentioned above likewise is to be considered as being used for purposes of convenience rather than in any limiting sense. For the purposes of the discourse to follow, the precepts of the miter assembly plate and components of the invention herein involved are described in regard to its utilization in connection with the assembly of mitered moldings made of wood, wood composite or any other appropriate material.

Figure 2:
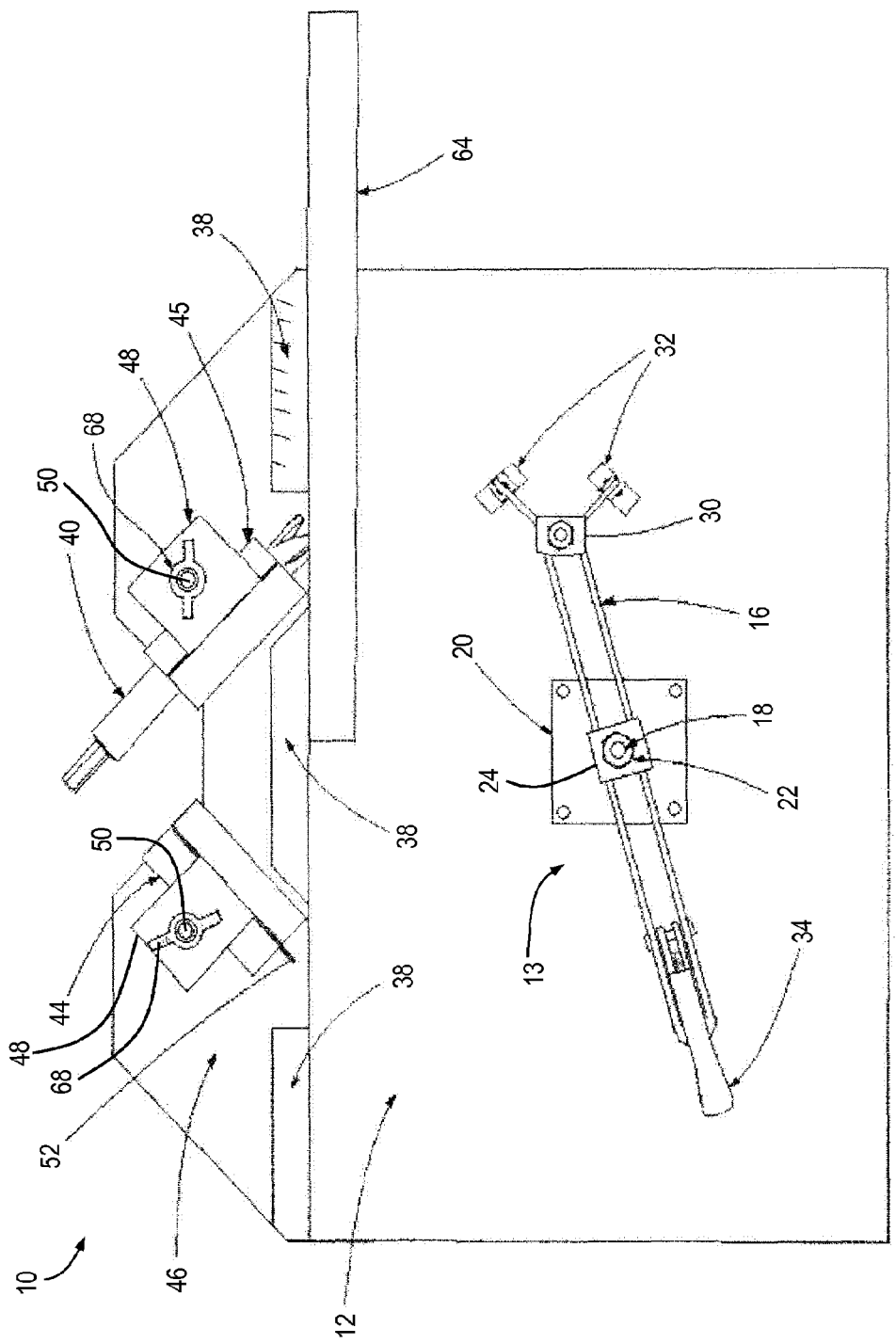
FIG. 2 is a top plan view of the assembly plate of FIG. 1, additionally depicting a piece of plug stock being partially penetrated by a bushed plug cutter.

FIGS. 1 and 2 depict a miter joint assembly tool 10 according to an embodiment of the present invention, FIG. 1 being a perspective frontal view and FIG. 2 being a top plan view. These figures depict a generally planar assembly plate 12 against which molding pieces 14a, 14b (FIG. 1) are clamped generally against the plate by means of a clamping assembly 13 comprising a rocker bar 16 formed in an elongated loop and free to pivot and slide forward or backward before pressure is applied. Rocker bar 16 is held by a post 18 that is fastened to a mounting plate 20 and in turn mounted to assembly plate 12, the post acting as a fulcrum by means of a restricting nut 22 and a first washer 24 above the bar, and a spring 26 and a second washer 28 below the bar. Clamping pressure is directed to individual molding pieces 14a, 14b by means of a swiveling two-legged bracket 30 having an attached pair of pads 32. A clamping lever 34 is depressed backward, advancing a pushrod 36 downward at the back end of rocker bar 16, thus holding the two sections of molding 14a, 14b firmly against assembly plate 12.

With reference to FIG. 1, moldings 14a, 14b are held firmly in place and are aligned diagonally to a drill guide assembly 37 by means of a fence 38. A boring bit 40 having a pilot portion 41 is guided to a precise point of depth as measured on a line perpendicular to assembly plate 12 on an outside edge of the clamped moldings 14a, 14b, the drilling point being adjusted relative to the thickness of the moldings by means of a repositionable drill bushing 42 that is offset within its rectangular housing 44, each of the four sides of the rectangular housing being incrementally varied as measured from the center of the bushing square to each of the four sides. Rectangular housing 44 is held firmly to a tooling plate 46 by a clamp 48, secured with a fastener 50, and oriented generally square and perpendicular to a miter joint 47 in moldings 14a, 14b by a spline 52 extending from a groove 54 in tooling plate 46. A mating groove 56 is placed into each of the four sides of the drill bushing housing 44, allowing for adjustment of the drilling point by selecting an appropriate side of the housing to place into contact with tooling plate 46.

Figure 3:
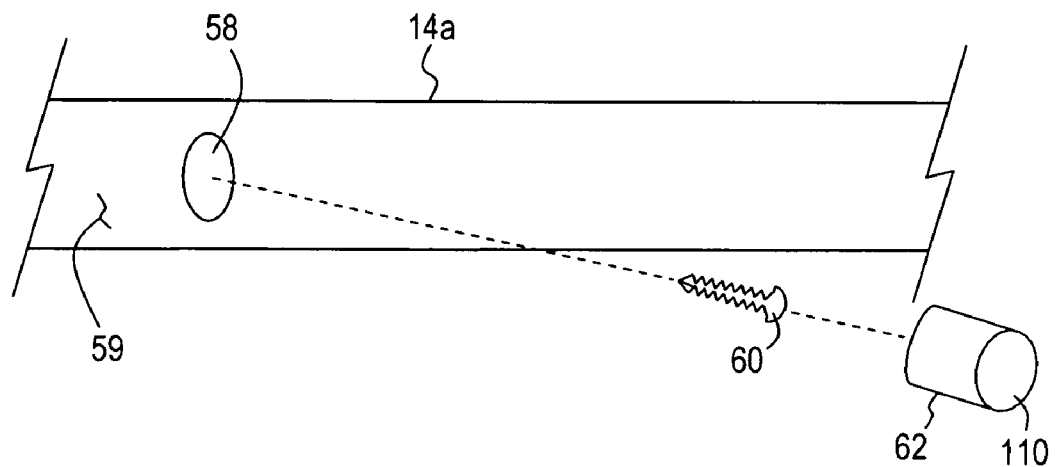
FIG. 3 is a partial side elevational view of a mitered molding, depicting an opening in the molding, a screw used to assemble together the molding to a mating molding, and a plug to close off the opening.

With reference to FIGS. 1-3 in combination, in operation a combination pilot hole 43 and pocket hole 58 is precisely drilled to a predetermined depth in first molding piece 14a with a boring bit 40 and a drill motor (not shown). Pocket hole 58 and pilot hole 43 are drilled into mitered piece 14a such that the pilot hole extends generally to the edge of mitered piece 14a but does not substantially extend into mitered piece 14b. A suitably-sized fastener such as a wood screw 60 is installed into holes 58, 43. Wood screw 60 is preferably a self-drilling and self-tapping screw, a head portion of the screw being retained by pocket hole 58 while a shank portion of the screw extends through pilot hole 43 and penetrates mitered piece 14b to draw together and join together mitered pieces 14a, 14b. Screw 60 is concealed within the pocket hole and maintains the desired alignment of the mitered molding pieces.

With continued reference to FIGS. 1-3, wooden plugs 62 to close off hole 58 are preferably fabricated by clamping a narrow strip of wood 64 (FIG. 2) of a similar type of wood as molding pieces 14a, 14b against fence 38. Drill bushing housing 44 is replaced with a plug cutting assembly 45 of similar shape and size to accommodate an elongated plug cutter. The plug cutting assembly is guided diagonally to the strip 64 so that plugs 62 produced thusly will have their grain oriented with the grain surrounding holes 58 of moldings 14*a*, 14*b* that are being closed.

Figure 4:
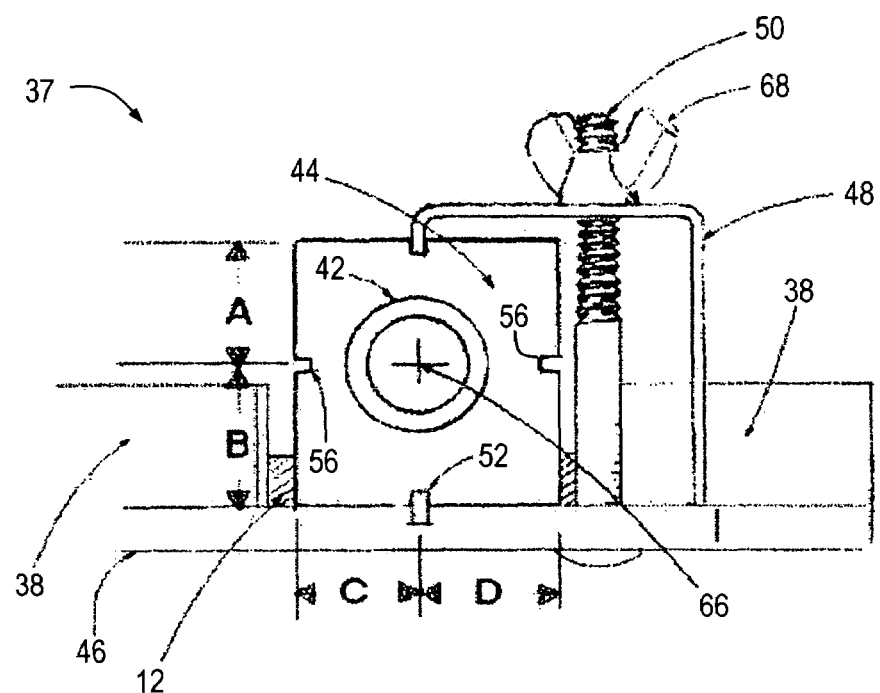
FIG. 4 is an end view of a bushing block clamped to a keyway, depicting the method of varying drill height by rotation of the block as it relates to varying thicknesses of moldings.

FIG. 4 is a side elevational view showing further details of drill guide assembly 37. Drill guide assembly 37 includes a drill bushing 42 within housing 44, the bushing being offset from the center of the housing so that measurements A, B, C, and D are incrementally different from one another. This allows adjustment of the position of the center line 66 of bushing 42 relative to assembly plate 12 by the appropriate selection and positioning of a side of the bushing housing 44 to be placed into contact with tooling plate 46. The bushing 42 is diagonally oriented to the edge of the molding aligned with the fence 38 and is perpendicularly oriented to the miter by means of a spline 52 extending from the tooling plate 46 and one of the four grooves 56 in each side of the housing 44. Housing 44 is secured to tooling plate 46 by a spring clamp 48, a screw 50 and a clamp nut 68.

Figure 5:
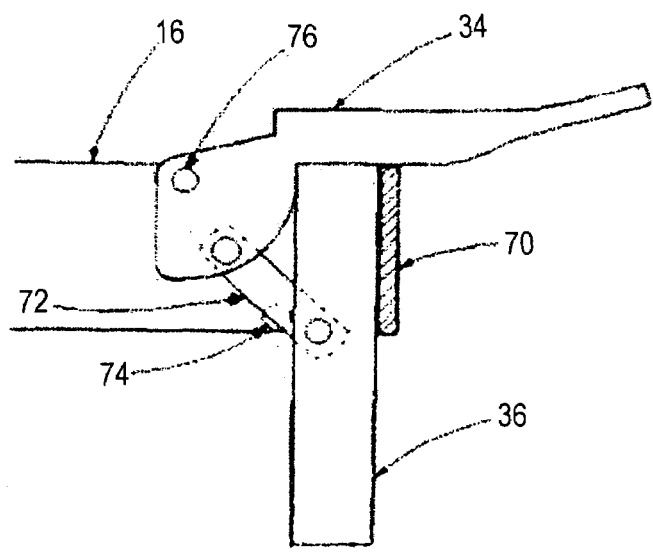
FIG. 5 is a straight line clamping device portion of the assembly plate of FIG. 1 that presses the front end of a bar clamp downwards onto a molding as the back end is raised by the plunger, the bar clamp rocking on a fixed center bolt.

FIG. 5 is a cutaway view showing further details of rocker bar 16 of FIGS. 1 and 2. This figure shows the mechanical structure of the straight-line clamping device wherein the clamping post 36 is "U"-shaped to fit within a bend 70 of the rocker bar to house a linkage bar 72. Clamping post 36 is held firmly against bend 70 by a stud 74 at a lower end. A semi-circular portion of lever 34 pivots about a fixed axis 76 as it is extended and withdrawn.

Figure 6:
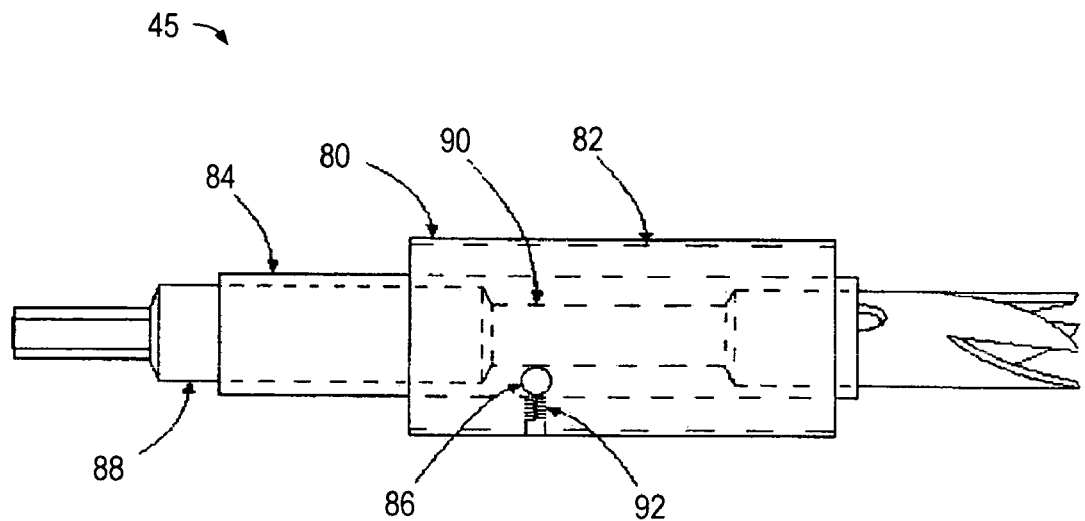
FIG. 6 is a bushed plug cutter with retaining pin.

With reference also to FIG. 2, FIG. 6 shows further details of plug cutting assembly 45 according to an embodiment of the present invention. Plug cutting assembly 45 comprises a generally rectangular block 80 having a plurality of grooves 82 that are similar to grooves 56 of drill guide 37, discussed above, for orientation on a tooling plate 46. Drill bushing 84 extends through block 80. Bushing 84 and block 80 are coupled together with a stop pin 86 run through both so as to limit travel of a plug cutter 88 by means of a length of a smaller diameter 90 of the bushing. Stop pin 86 is, in turn, held in place by a set screw 92.

Figure 7:
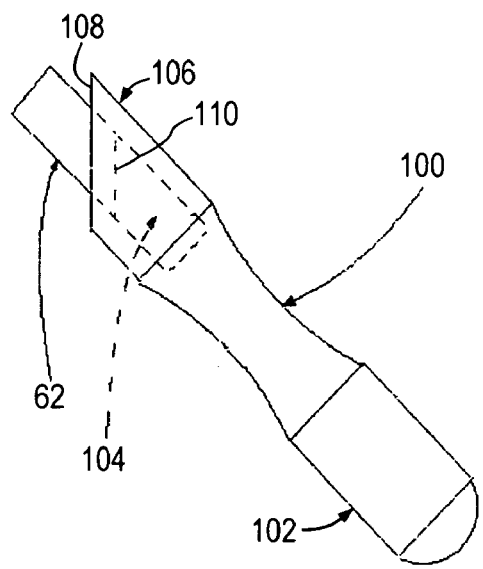
FIG. 7 is an insertion tool designed to hold the diagonally-cut ends of plugs produced to fill screw holes in the mitered pieces.

FIG. 7 depicts a plug insertion tool 100 according to an embodiment of the present invention. Insertion tool 100 has a handle portion 102 that is shaped for a comfortable fit in the user's hand. A generally cylindrical opening 104 in a working end 106 of the tool has a generally planar surface 108 that is oriented diagonally relative to a longitudinal axis of handle portion 102. With reference to FIGS. 3 and 6 in combination, using tool 100 a round plug 62 that is diagonally cut at one end 110, can be inserted into a snug-fitting hole 58 of molding 14*a* such that end 110 is substantially flush with a surface 59 of the molding. Plug 62 is thus installed without damage to the edges of the diagonally cut end 110 of the plug, which will be exposed to view once it is installed into hole 58.

Figure 8A:
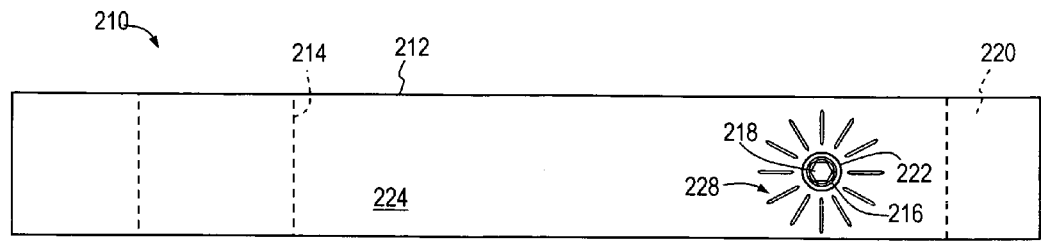
FIG. 8A is a front elevational view of an accessory fence according to an embodiment of the present invention.
Figure 8B:
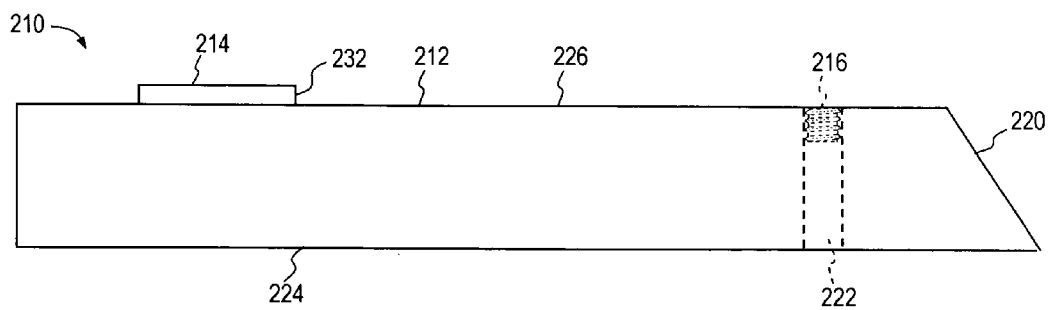
FIG. 8B is a top plan view of the accessory fence of FIG. 8A.
Figure 8C:
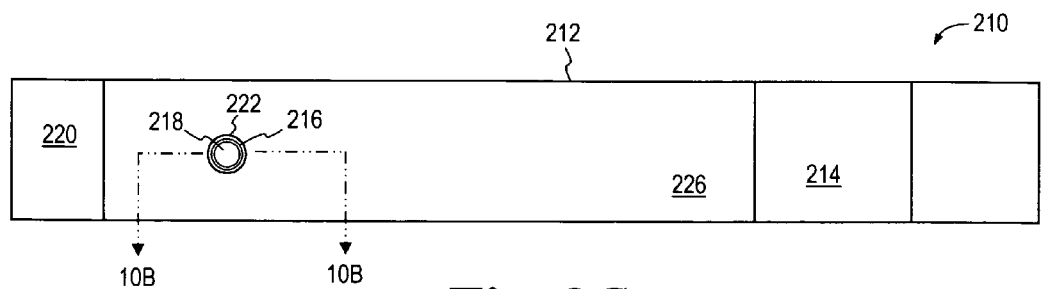
FIG. 8C is a rear elevational view of the accessory fence of FIG. 8A.

With reference to FIGS. 8A, 8B and 8C, details of an accessory fence 210 are shown in accordance with an embodiment of the present invention. Accessory fence 210 comprises in substantial part an arm 212, a stop 214, a threaded insert 216 and a set screw 218.

Arm 212 is generally rectangular and longitudinal, with a tapered end 220. Tapered end 220 provides clearance between accessory fence 210 and a saw blade for various angular settings of the pivot arm of the miter saw, as will be detailed further below. Arm 212 further includes an opening 222 extending through the width of the arm from a front surface 224 to a rear surface 226. Arm 212 may be formed from any suitable material including, without limitation, wood, plastic, metal and composites, and may be formed by any conventional process, such as sawing, molding, casting, machining and lay-up.

A plurality of indices 228 are formed on front surface 224, generally surrounding opening 222. Indices 228 may be integrally formed with arm 212, such as by molding or machining, or may be a self-adhesive label. Indices 228 may also be applied with a pencil, ink pen or permanent marker using a stencil, such as stencil 230, shown in FIG. 9.

Arm 212 may be fitted with a stop 214 to position the arm with respect to a cutting fence of a miter saw, as will be further explained below. Stop 214 extends from rear surface 226 and includes a stop edge 232 that is generally orthogonal to the rear surface. Stop 214 is configured to engage a cutting fence, as detailed further below. Stop 214 may be integrally formed as part of arm 212, or may be formed separately and attached to the arm. Stop 214 may be formed from any suitable material including, without limitation, wood, plastic, metal and composites, and may be formed by any conventional process, such as sawing, molding, casting, machining and lay-up. In various embodiments stop 214 may be permanently fastened to arm 212, or may be movable along the length of the arm and releasably secured thereto with any type of conventional fasteners, such as screws, latches, locks, retainers, hook-and-loop, and tabs.

Figures 10A, 10B:
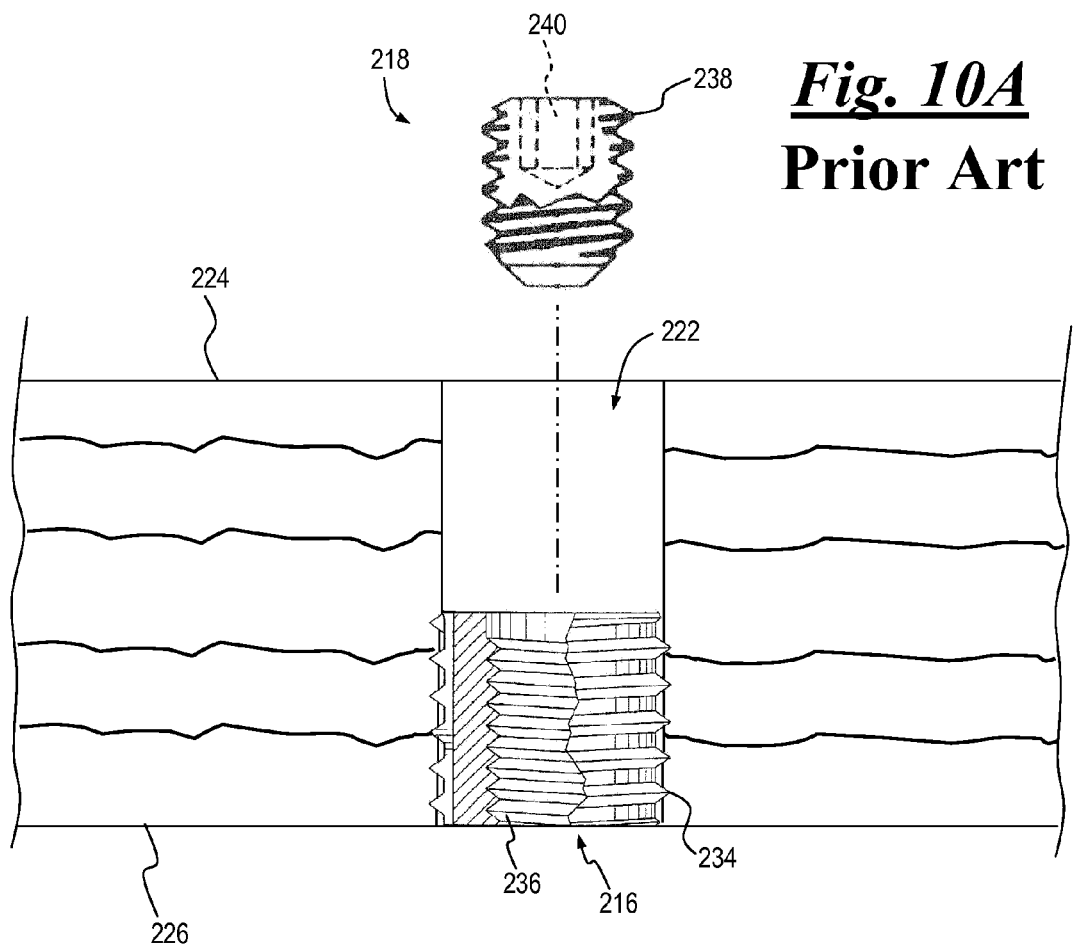
FIG. 10A depicts a set screw according to an embodiment of the present invention.
FIG. 10B is a view in section of a threaded insert according to an embodiment of the present invention.

With particular reference now to FIGS. 8A, 8B and 10B, threaded insert 216 is a conventional insert having external threads 234 that are configured to engage the walls of opening 222. Threaded insert 216 also includes internal threads 236. Insert 216 is threadably inserted into opening 222 and located proximate rear surface 226 of arm 212. In some embodiments of arm 212, such as those formed from plastic, threaded insert 216 may be molded into the arm. In still other embodiments of arm 212, such as those formed from metal, internal threads 36 may be formed directly in opening 222, eliminating the need for a separate threaded insert 216.

As shown in FIGS. 10A and 10B, set screw 218 is a conventional set screw having external threads 238 that are configured to engage internal threads 236 of insert 216. Set screw 218 further includes a drive portion 240, shown to be hexagonal-shaped but may be configured to receive drivers such as, without limitation, a Philips or slotted screwdriver or an Allen wrench.

An adjustment tool 242 for use with accessory fence 210 is shown in FIG. 11. Adjustment tool 242 comprises a driver 244 with a pointer 246 coupled thereto. Pointer 246 is generally planar and has a substantially round aperture 248 configured to receive driver 244, as shown in FIG. 12. Driver 244, shown in FIG. 13, may be any conventional type of driver, such as a Philips or slotted screwdriver or an Allen wrench, and includes a drive end 247 shaped to engage drive portion 240 of set screw 218. Pointer 246 may be formed from plastic, metal, composite or paperboard by any conventional process, such as stamping, die-cutting, molding and machining. Adjustment tool 242 is assembled by press fitting pointer 246 onto driver 244 where it is held in place by friction, as depicted in FIG. 11. Aperture 248 is configured to be rotatable about a longitudinal portion 245 of driver 244, yet have sufficient interference or friction with respect to the longitudinal portion to remain at a set orientation or position.

Figure 14:
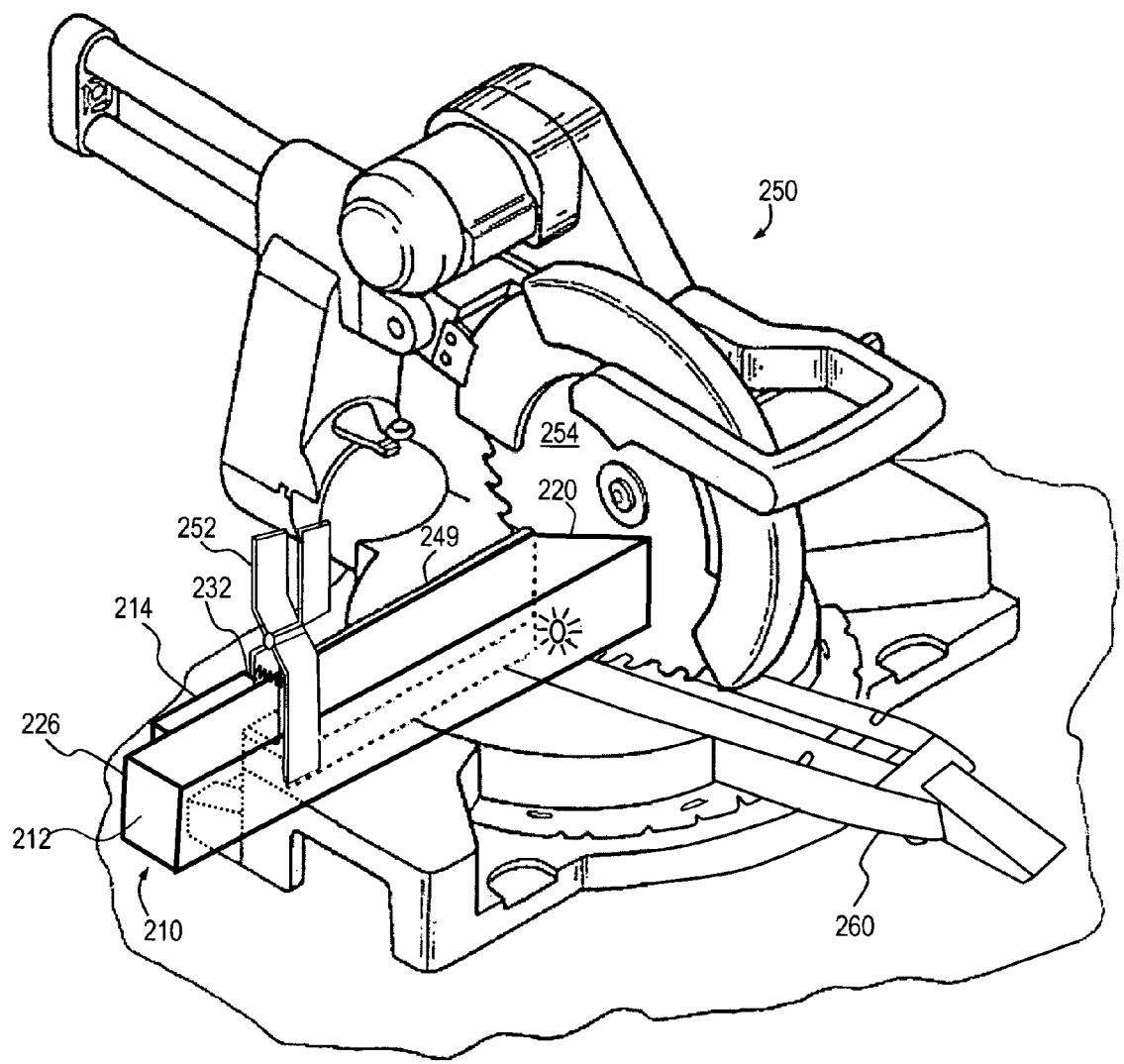
FIG. 14 depicts an accessory fence coupled to a miter saw according to an embodiment of the present invention.
Figure 15:
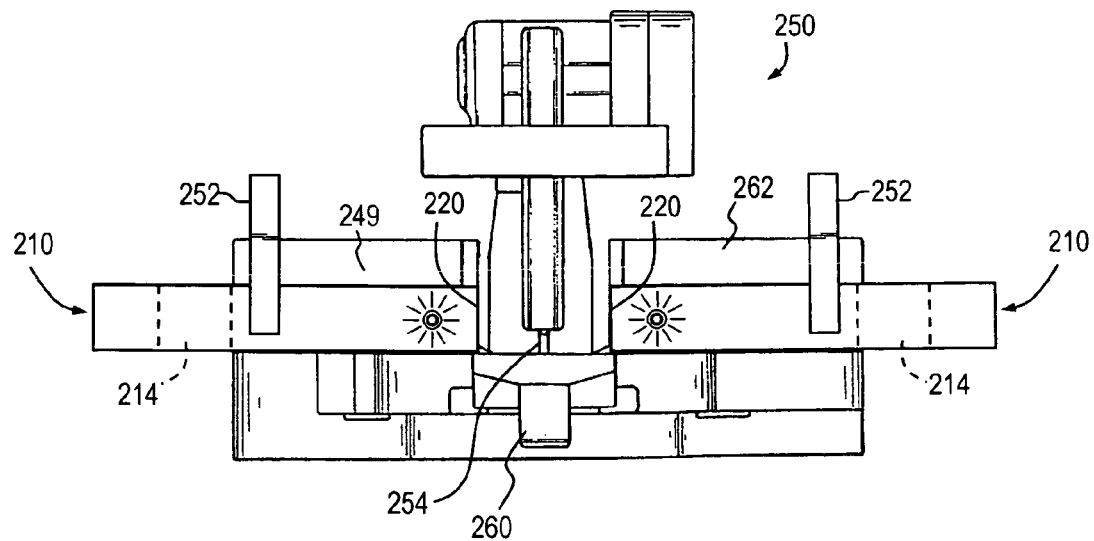
FIG. 15 is a front elevational view of the accessory fence and miter saw of FIG. 14.
Figure 16:
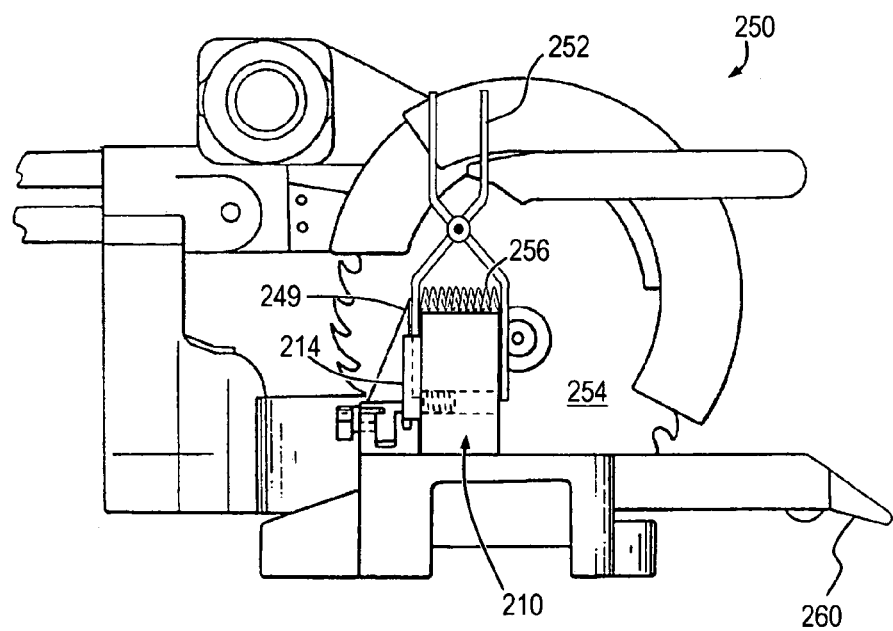
FIG. 16 is a side elevational view of the accessory fence and miter saw of FIG. 14.
Figure 17:
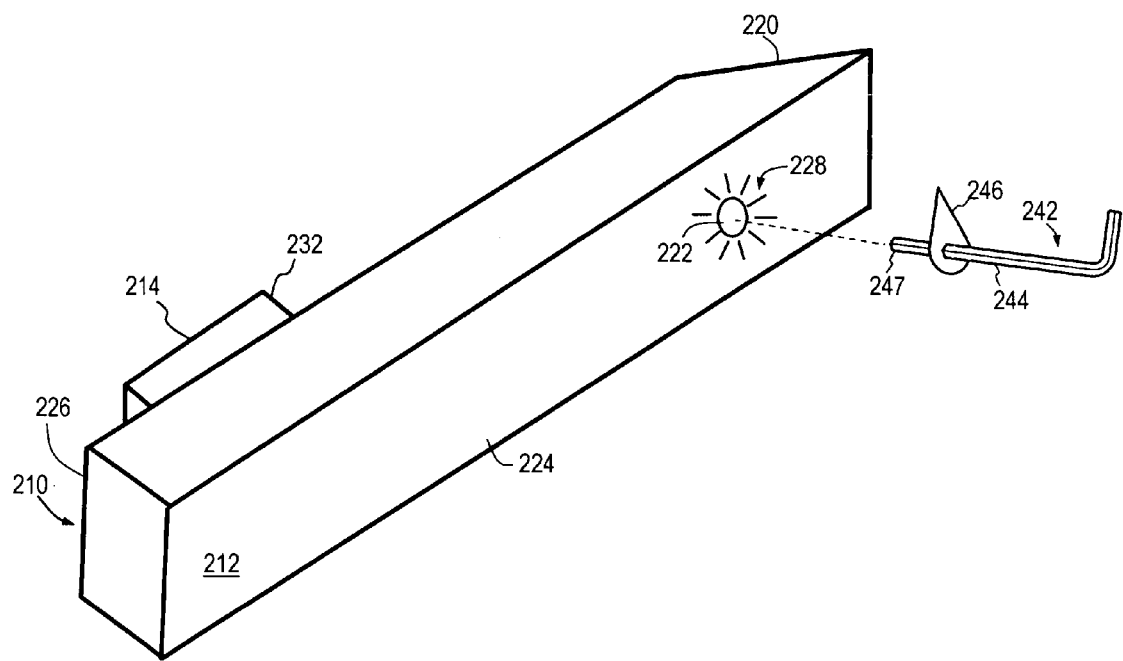
FIG. 17 depicts an adjustment tool being inserted into an opening of an accessory fence according to an embodiment of the present invention.

Referring now to FIGS. 14, 15 and 16 in combination, accessory fence 210 is shown secured to a cutting fence 249 of a miter saw 250 with a fastener 252. As can be seen, tapered end 220 is placed proximate a saw blade 254 of miter saw 250. Tapered end 220 provides clearance between accessory fence 210 and saw blade 254 for various angular settings of a pivot arm 260 of the miter saw 250. Accessory fence 210 is further oriented such that rear surface 226 of arm 212 is proximate cutting fence 249. In addition, stop edge 232 of stop 214 is placed proximate an end of cutting fence 249, distal to saw blade 254.

Fastener 252 is located intermediate stop edge 232 and opening 222, generally proximate stop 214. Fastener 252 may be any type of clip or clamp having threads or a biasing element 256, such as a spring, to resiliently urge arm 212 against cutting fence 249.

With reference to FIGS. 14, 15, 16 and 17 in combination, after accessory fence 210 is installed to miter saw 250 as discussed above, set screw 218 is adjusted with adjustment tool 242 by inserting drive end 247 of the adjustment tool into opening 222 such that the drive end engages drive portion 240 of the set screw and pointer 246 is proximate indices 228. Adjustment tool 242 is then rotated clockwise or counterclockwise as needed such that set screw 218 lightly contacts cutting fence 249. One indication of this setting is to place a sheet of paper (not shown) between cutting fence 249 and opening 222 at rear surface 226, then adjusting set screw 218 until a slight resistance is felt when the paper is moved.

Once set screw 218 is adjusted to slightly contact cutting fence 249 as described above, the position of pointer 246 relative to indices 228 is noted. If desired, pointer 246 may be rotated about longitudinal portion 245 of driver 244 such that the pointer is generally aligned with a selected index mark 228. Adjustment tool 242 is then rotated to cause set screw 218 to project from arm 212 by a determinable amount, which is measurable by observing the rotation of pointer 246 relative to indices 228. In response to the projection of set screw 218 against cutting fence 249, arm 212 pivots generally about stop edge 232 and is forced away from the cutting fence by small angular increments that are proportional to the portion of the set screw that projects from arm 212. Front surface 224 accordingly serves as a finely-adjustable cutting fence, allowing for precise setting of the angular relationship between the front surface and the cutting fence. Material to be miter cut is placed against surface 226, the angle of the cut being determined by the pivot arm 260 of the miter saw in combination with the relative orientation of front surface 224 with respect to cutting fence 249, as established by set screw 218.

Figure 18:
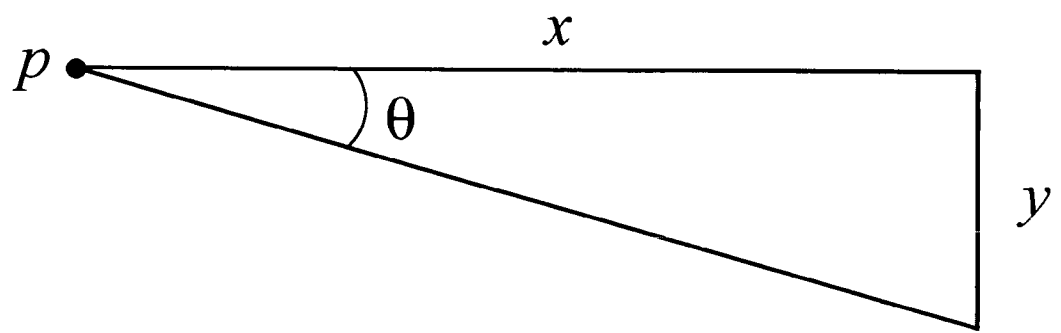
FIG. 18 is a diagram depicting the trigonometric relationship between an accessory fence of the present invention and a fence of a miter saw.

With continued reference to FIGS. 14, 15, 16 and 17, accessory fence 210 and adjustment tool 246 can be calibrated to quantify the angular displacement of front surface 224 of arm 212 with respect to cutting fence 249, using the trigonometric relationship shown in FIG. 18. The angle θ, representing the angular relationship between cutting fence 249 and front surface 224, may be expressed by Equation 1:

$$TAN\theta = \frac{y}{x}$$ Equation 1 where: x=the distance along cutting fence 249 from a pivot point p, established by stop edge 232, to set screw 218 at its point of contact with the cutting fence; and y=the distance that set screw 218 projects from rear surface 226 of arm 212.

Using Equation 1, indices 228 and pointer 246 may be calibrated such that each index mark represents a determinable fraction of a degree of change in the angular relationship between cutting fence 48 and front surface 224 of arm 212. The calibration can be determined by calculating or measuring the change in x and y as adjustment tool 242 is correspondingly rotated from one index mark 228 to an adjacent index mark.

In various embodiments a threaded insert 216 and set screw 218 having a greater or lesser mating thread pitch may be selected, depending upon the resolution of adjustment desired for accessory fence 210. For example, if a smaller degree of change in θ is desired for each movement of pointer 246 from one index mark 228 to an adjacent index mark is desired, a threaded insert 216 and set screw 218 having corresponding finer pitches of threads 236, 238 (see FIGS. 10A, 10B) may be selected. Conversely, coarser thread pitches 236, 238 may be selected if a greater change in θ is desired for each movement of pointer 246 from one index mark 228 to an adjacent index mark.

Accessory fence 210 is shown in the various figures being mounted to the left of saw blade 254, and thus may be termed a "left-hand" accessory fence for cutting one casement to form a first half of the mitered joint. One skilled in the art will readily realize that many miter saws include a cutting fence extending not only to the left of the saw blade, but also to the right as well in order to cut a second casement to form the second half of the mitered joint. The accessory fence of the present invention may likewise be configured as a "right-hand" accessory fence, the right-hand configuration being a mirror image of the left-hand configuration disclosed herein and coupled to a right-hand fence 262 (see FIG. 15). Alternatively, the left-hand accessory fence detailed above may simply be turned end-over-end such that stop 214 is placed proximate an end of right-hand cutting fence 268 and tapered end 220 is proximate blade 254, as depicted in FIG. 15. Further details of these implementations of a right-hand configuration of accessory fence 210 are straightforward and are thus left to the artisan.

Figure 19:
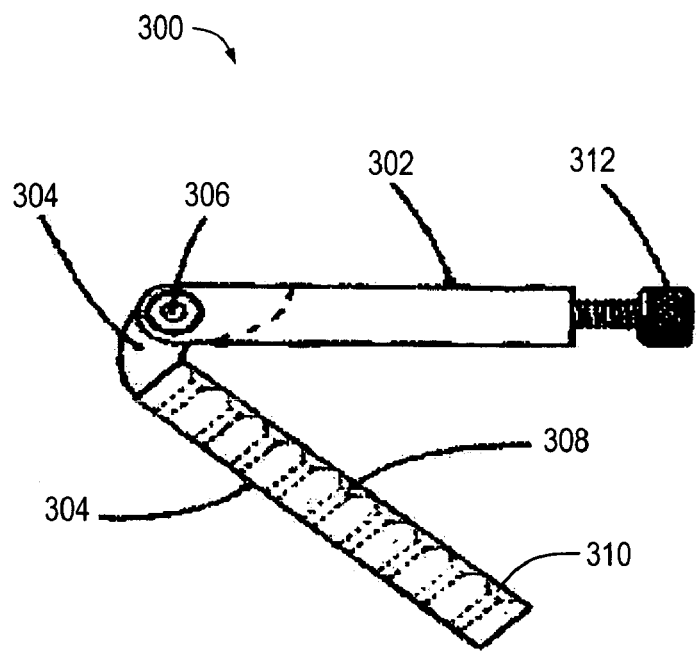
FIG. 19 is a pivoting adjustable stop for a miter saw according to another embodiment of the present invention.
Figure 20:
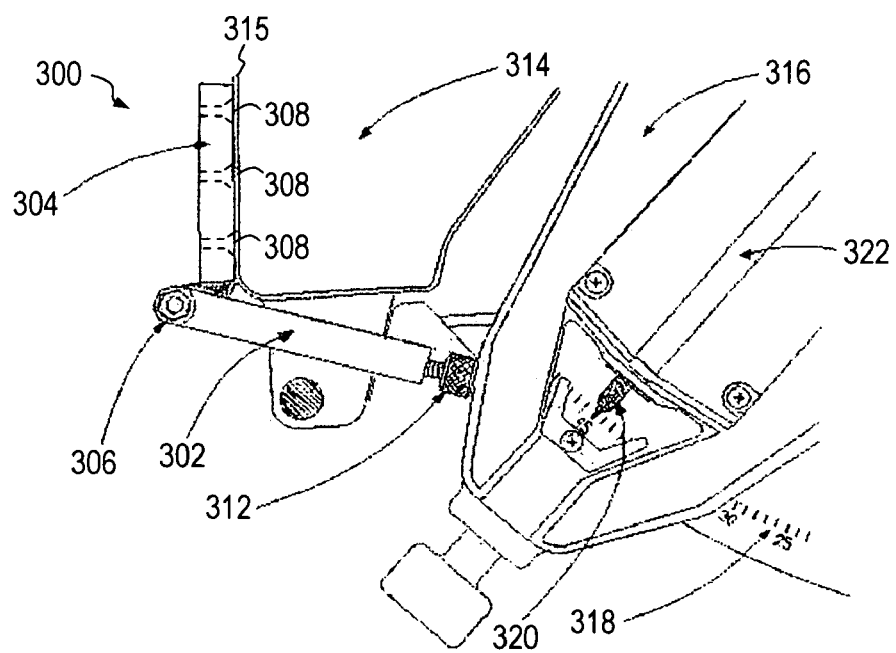
FIG. 20 is a partial top plan view of a typical miter saw table with one embodiment of an adjustable miter stop installed.

With reference to FIGS. 19 and 20 in combination, a miter stop assembly 300 is shown according to an alternate embodiment of the present invention. Miter stop assembly 300 is foldable and includes first and second segmented bars 302, 304 respectively that are pivotably joined at an axis point 306. Second bar 304 is mounted to a miter saw table 314 by means of screws 308 through holes 310. The first segment 302 is pivotable into generally perpendicular alignment with an adjustment portion 316 of miter table 314 and positioned to stop movement of the adjustment portion by means of contact with an adjustable bumper, such as stop screw 312 of miter stop assembly 300. Other structures may also be used as bumpers including, without limitation, clips, tabs, tangs, studs, flaps and flanges made of metal, composite, resilient and plastic materials separately or in combination. First segment 302 may be folded out of the way to allow other angles to be cut.

FIG. 20 shows one embodiment of the folding miter stop 300 of FIG. 19 mounted to a miter table 314 wherein second bar 304 is fastened to a stationary portion 315 of the miter table and first bar 302 is opened on its axis 306 to stop movement of the adjustment portion 316 against screw 312. With the use of stop screw 312, minute adjustments may be made short of or beyond an angle set by a spring-loaded detent in or under a miter gage 318 and indicated by a pointer 320. This allows a blade of a saw (not shown) to travel along a slot 322 at the necessary angle to achieve the desired angle of cut for the miter joint, as discussed above.

In operation of the disclosed invention, mitered pieces 14a, 14b are cut on a miter table to the desired angle (FIGS. 8A through 20). A wood plug 62 is formed of the same material as pieces 14a, 14b by using plug cutting assembly 45 (FIGS. 2 and 6). Mitered pieces 14a, 14b are fixtured to assembly tool 10 (FIGS. 1 and 2). A pocket hole 58 and a pilot hole 43 are drilled into mitered piece 14a, the pilot hole extending generally to the edge of mitered piece 14a and not substantially extending into mitered piece 14*b* (FIGS. 1-3). A suitably-sized wood screw 60 is installed into holes 58, 43. Wood screw 60 may be provided as a self-drilling and self-tapping screw, a head portion of the screw being retained by pocket hole 58 while a shank portion extends through pilot hole 43 and penetrates mitered piece 14*b* to draw together and join together mitered pieces 14*a*, 14*b* (FIG. 3). Insertion tool 100 (FIG. 7) is then utilized to install plug 62 into hole 58, closing the hole (FIGS. 3 and 7). Details of each of these steps are discussed above in the text associated with each figure.

While this invention has been shown and described with respect to a detailed embodiment thereof, it will be understood by those skilled in the art that changes in form and detail thereof may be made without departing from the scope of the claims of the invention.

What is claimed is:

1. A miter joint assembly system, comprising:
a generally planar assembly plate;
a clamping assembly attached to the assembly plate; and
at least one drill guide detachably coupled to the assembly plate at a predetermined orientation,
wherein the clamping assembly is configured to releasably secure a first and a second mitered molding to the assembly plate such that the first and second mitered moldings are oriented generally orthogonally to each other, and
wherein the at least one drill guide is configured to guide a tool to bore a pocket hole and a pilot hole into the first mitered molding, the pocket and pilot holes receiving a fastener to draw and secure the second mitered molding to the first mitered molding, the at least one drill guide comprising a generally rectangular block including a drill bushing offset from the center of the block such that the bushing position is adjustable by changing which side of the block contacts the assembly plate.

2. The miter joint assembly system of claim 1, further comprising a plug cutting assembly releasably attached to the assembly plate and configured to produce a plug having a diagonally cut end relative to a longitudinal direction of the plug.

3. The miter joint assembly system of claim 2 wherein the plug cutting assembly further comprises a drill bushing slidably retained by a generally rectangular block.

4. The miter joint assembly system of claim 3 wherein the drill bushing of the plug cutting assembly is offset from the center of the block of the plug cutting assembly and is adjustably spaced apart from the assembly plate.

5. The miter joint assembly system of claim 1, further comprising a plug insertion tool configured to insert a plug into the pocket hole.

6. The miter joint assembly system of claim 1 wherein the generally rectangular block of the at least one drill guide includes grooves.

7. The miter joint assembly system of claim 1 wherein the at least one drill guide is held firmly to the plate by a clamp.

8. The miter joint assembly system of claim 1 wherein the fastener is a self-drilling and self-tapping wood screw.

9. A miter joint assembly system, comprising:
a generally planar assembly plate;
a clamping assembly attached to the assembly plate;
at least one drill guide detachably coupled to the assembly plate at a predetermined orientation;
a plug cutting assembly releasably attached to the assembly plate and configured to produce a plug having a diagonally cut end relative to a longitudinal direction of the plug, the plug cutting assembly including a generally rectangular block and a drill bushing offset from the center of the block such that the bushing position is adjustable by changing which side of the block contacts the assembly plate;
a plug insertion tool configured to insert the plug into a pocket hole; and
an adjustable accessory fence to aid in cutting miter joints in a first and a second mitered molding,
wherein the accessory fence is configurable to enable the cutting of miter joints in the first and second mitered moldings at a predetermined angle,
wherein the clamping assembly is configured to releasably secure the first and second mitered moldings to the assembly plate such that the first and second mitered moldings are oriented generally orthogonally to each other,
wherein the at least one drill guide is configured to guide a tool to bore the pocket hole and a pilot hole into the first mitered molding, the pocket and pilot holes receiving a fastener to draw and secure the second mitered molding to the first mitered molding, and
wherein the plug cutting assembly is configurable to produce the plug, the plug being adapted to close the pocket hole when inserted therein by the plug insertion tool.

10. A miter joint assembly system, comprising:
a generally planar assembly plate;
a clamping assembly attached to the assembly plate;
at least one drill guide detachably coupled to the assembly plate at a predetermined orientation;
a plug cutting assembly releasably attached to the assembly plate and configured to produce a plug having a diagonally cut end relative to a longitudinal direction of the plug, the plug cutting assembly including a generally rectangular block and a drill bushing offset from the center of the block such that the bushing position is adjustable by changing which side of the block contacts the assembly plate;
wherein the clamping assembly is configured to releasably secure the first and second mitered moldings to the assembly plate such that first and second mitered moldings are oriented generally orthogonally to each other,
wherein the at least one drill guide is configured to guide a tool to bore a pocket hole and a pilot hole into the first mitered molding, the pocket and pilot holes receiving a fastener to draw and secure the second mitered molding to the first mitered molding, and
wherein the plug cutting assembly is configurable to produce the plug, the plug being adapted to close the pocket hole when inserted therein.

* * * * *

UNITED STATES PATENT AND TRADEMARK OFFICE
CERTIFICATE OF CORRECTION

| | | |
|---|---|---|
| PATENT NO. | : 7,617,578 B2 | Page 1 of 1 |
| APPLICATION NO. | : 11/361944 | |
| DATED | : November 17, 2009 | |
| INVENTOR(S) | : David Collins | |

It is certified that error appears in the above-identified patent and that said Letters Patent is hereby corrected as shown below:

Column 3, line 64, replace ""rearward."" with --"rearward,"--.

Signed and Sealed this

Twenty-ninth Day of December, 2009

David J. Kappos
*Director of the United States Patent and Trademark Office*